United States Patent [19]

Schneider et al.

[11] 4,148,867
[45] Apr. 10, 1979

[54] PRODUCTION OF SYNTHETIC FLUORSPAR

[75] Inventors: Siegfried Schneider, Cologne; Hans Niederprüm, Monheim, both of Fed. Rep. of Germany

[73] Assignee: Bayer Aktiengesellschaft, Leverkusen, Fed. Rep. of Germany

[21] Appl. No.: 704,252

[22] Filed: Jul. 12, 1976

[30] Foreign Application Priority Data

Jul. 24, 1975 [DE] Fed. Rep. of Germany ....... 2533128

[51] Int. Cl.$^2$ .................... C01F 11/22; C01B 33/14
[52] U.S. Cl. .................................. 423/490; 423/335; 423/338
[58] Field of Search ................... 423/490, 335, 338

[56] References Cited

U.S. PATENT DOCUMENTS

| 1,091,795 | 3/1914 | Bidtel | 423/490 X |
| 2,780,523 | 2/1957 | Gloss | 423/490 X |
| 3,551,332 | 12/1970 | Baumann et al. | 423/490 X |
| 3,907,978 | 9/1975 | Spreckelmeyer | 423/490 |

Primary Examiner—Edward Stern
Attorney, Agent, or Firm—Sprung, Felfe, Horn, Lynch & Kramer

[57] ABSTRACT

In the production of a synthetic fluorspar of low silicon dioxide content wherein hexafluosilicic acid is added in an amount ranging from slightly below up to about stoichiometric amount to an aqueous calcium carbonate suspension at a temperature from about 0° to 40° C., and the calcium fluoride formed is separated off from the dilute silica sol and optionally washed out, the improvement which comprises reacting the calcium carbonate with the hexafluosilicic acid in such a way that the pH-value of the fully reacted solution amounts to between about 3.6 and 4.6, and adding a fast-reacting proton acceptor to the reaction mixture immediately before separation of the calcium fluoride in amount sufficient to raise the pH to about 5.0 to 6.4, preferably about 5.8 to 6.2. Suitable proton acceptors include the alkali metal and ammonium hydroxides carbonates and hydrogen carbonates or alkaline earth metal hydroxide. Anionic or non-ionic dispersants may also be added and the calcium fluoride is separated by decanting or centrifugation within about 1 second to 10 minutes, preferably about 4 to 10 seconds, after raising the pH. The separated calcium fluoride may be washed to remove silica sol therefrom and then again be treated to raise its pH before separation.

10 Claims, No Drawings

PRODUCTION OF SYNTHETIC FLUORSPAR

This invention relates to a further development of the process according to U.S. Pat. No. 3,907,978 for producing a synthetic fluorspar ($CaF_2$) having a low silicon dioxide content from hexafluosilicic acid ($H_2SiF_6$) by precipitation in an aqueous calcium carbonate suspension.

In this known process, aqueous hexafluosilicic acid is added to a suspension of calcium carbonate in water at temperatures in the range from about 0° C. to 40° C. the suspension containing at least about 3 and preferably at least about 5 parts, by weight, of water per part, by weight of calcium carbonate. The process can be carried out particularly economically with suspensions containing about 5 to 15 parts, by weight, of water per part, by weight, of calcium carbonate.

The process is particularly suitable for working up hexafluosilicic acids of the type which accumulate during the processing of apatite. Solutions having an $H_2SiF_6$ content of about 5 to 30%, by weight, may be used.

In one preferred embodiment, ground calcium carbonate suspended in water is reacted with hexafluosilicic acid under substantially stoichiometric conditions, either continuously or in batches, in such a way that the pH-value, amounting to between about 2 and 3 at the beginning of the reaction, amounts to between about 4 and 6 in the fully reacted solution. The calcium fluoride formed is then separated off from the silica sol, giving a so-called synthetic fluorspar having a purity of about 85 to 95%, by weight, for an $SiO_2$ content of about 1 to 4%, by weight, and a $CaCO_3$ content of from about 2 to 10%, by weight. The filtrate accumulating has an $SiO_2$ content of about 1 to 3%, by weight, and a fluorine content of less than about 0.01%, by weight. The filtrate may be used as silica sol after appropriate concentration. In addition, the $SiO_2$ may be flocculated and used as a filler. Finally, the filtrate may also be recycled to the apatite digestion stage, optionally after concentration. This is of particular advantage in the case of apatites having a low $SiO_2$ content in order to liberate as much of the fluorine present as possible.

The present invention relates to a further development of the process in which hexafluosilicic acid is added in a substantially stoichiometric quantity or, preferably, in a slight deficit to an aqueous calcium carbonate suspension at temperatures of from about 0° C. to 40° C., the calcium fluoride formed is separated off from the dilute silica sol and, optionally washed, distinguished by the fact that reaction of the calcium carbonate with the hexafluosilicic acid is carried out in such a way that the pH-value of the fully reacted solution amounts to between about 3.6 to 4.6, and fast-reacting proton acceptors, such as hydroxides, carbonates, hydrogen carbonates of the alkalis, including ammonium and/or calcium hydroxide, are added to the reaction mixture immediately before the calcium fluoride is separated off in order to raise the pH to a value of about 5.0 to 6.4 and preferably to a value of about 5.8 to 6.2.

Whereas the fully reacted solution remains stable for several hours without gelation of the silica sol before the pH is raised, depending upon the adjusted pH-value of about 3.6 to 4.6, the reaction mixture has to be further processed immediately after the pH is raised, i.e. approximately 1 second to 10 minutes and preferably about 4 to 10 seconds after the pH is raised. Accordingly, the proton acceptors are added immediately before the calcium fluoride is separated off from the silica sol, i.e. for example in the feed pipe of a decanter or a batch-centrifuge or any other suitable filtration apparatus.

It was found, especially during further development of the process according to U.S. Pat. No. 3,907,978 on a commercial scale that, depending upon the calcium carbonate used, the calcium fluoride precipitated showed more or less pronounced dilatant and thixotropic properties after separation on the silica sol which is also formed during the reaction. In general, it is the dilatant behavior which first becomes apparent, being reflected in solidification of the sludge under shear stressing. It is only after this solidification has been eliminated, for example by vigorous stirring, that the sludge assumes thixotropic or structurally viscous flow properties.

This flow behavior is extremely unfavorable in separating operations carried out on a commercial scale, whether by filtration or by centrifuging, and for example can make the basically advantageous separation of solids using a continuously operating full-jacket screw centrifuge (decanter) extremely difficult or even totally impossible to carry out. Under the effect of the centrifugal forces and the shear forces applied by the discharge screw, the resistance increases to such a considerable extent that the screw is no longer able to discharge the solids. Alternatively, the screws used have to be able to apply very powerful forces and, hence, operate unfavorably from the point of view of energy consumption.

It is known that thixotropic properties in particular are frequently produced by silica sols. However, it was in fact found that the calcium fluoride shows dilatant and/or thixotropic behavior both in the presence of the filtrate, i.e. the dilute silica sol, and also following separation of the filtrate and complete removal of $SiO_2$ unless it is present in the form of quartz from the calcium carbonate used. Accordingly, the undesirable properties of the calcium fluoride cannot be explained by the simultaneous presence of silica sol.

As already mentioned, reaction of ground calcium carbonate in aqueous suspension with about 5 to 30%, by weight, hexafluosilicic acid is carried out in single-stage or multistage mixing units in such a way that the fully reacted solution has a pH-value of about 3.6 to 4.6. The reaction mixture is relatively stable, in other words it can be left standing for 1 to 3 hours without $SiO_2$ being precipitated from the silica sol by gelation. In order to favorably influence the flow properties of the calcium fluoride, the pH is then adjusted to a value of from about 5.2 to 6.5 immediately before separation. The silica sol remains stable for a short time under these conditions so that the calcium fluoride can be separated off before gelation occurs. However, separation of the silica sol has to be carried out within a period of about 10 minutes after the pH is raised in order to obtain a calcium fluoride having the lowest possible $SiO_2$ content.

The pH-value may be raised by the addition of substances which are able to bind protons in the shortest possible time. Accordingly, alkali metal or ammonium hydroxides, carbonates or hydrogen carbonates or alkaline earth hydroxides, preferably calcium hydroxide, are used. It is preferred to use, for example, NaOH in just sufficient a quantity that separation through a decanter takes place without any interruptions and the solid shows the required flow properties.

Calcium fluoride freshly prepared from calcium carbonate and hexafluosilicic acid generally continues to react for a while in the moist condition, as a result of which the pH-value initially adjusted decreases again. For example, a small quantity of calcium silicofluoride may still be present and is subsequently hydrolyzed with consumption of OH-ions. Accordingly, the pH-value of a separated calcium fluoride sludge falls again. If it is subsequently resuspended with water in order to wash out the silica sol still present, then the same difficulties, due to the dilatant behavior, may possibly be encountered that were described earlier on with reference to the calcium fluoride before separation of the silica sol. By repeating the increase in pH, the calcium fluoride can be readjusted to a pasty consistency so that, for example, separation by means of a decanter is again possible and effective washing guaranteed.

In the context of the invention, a pasty consistency is defined as being a state in which the sludge is neither markedly dilatant, rheopexic, thixotropic nor inherently viscous, but essentially shows Newtonian or Bingham fluidity.

For carrying out the process according to the invention, it is immaterial whether reaction of the calcium carbonate suspension with hexafluosilicic acid has been carried out in batches or continuously in a cascade. In either case, the fluidity of the solids may be favorably influenced for separation by the process according to the invention without the $SiO_2$-content of the separated sludge being significantly increased as a result. In addition, following application of the measures described above, the water content in the calcium fluoride sludge is hardly any higher than in untreated samples.

In order to further improve the fluidity of the calcium fluoride sludge, especially in regard to separation in a decanter, standard commercial-grade surfactants, preferably anionic wetting agents and/or non-ionic dispersants and emulsifiers, may also be added to the suspension. For example, these products may be alkyl sulfonates or derivatives of polyethers of the commercially available type. Depending upon the type of surfactants used and also upon the type of calcium carbonate used, it is sufficient to add quantities of about 5 to 50 ppm, based on the calcium fluoride suspension, in order to reduce or eliminate dilatant behavior in the solid separated. The addition of the fast-reacting proton acceptors may be considerably reduced by using the surfactants so that the favorable effect upon the flow properties of the calcium fluoride can be obtained with a minimum of additional chemicals. Also, addition of the chemicals may be readily automated, for example by coupling input into the feed pipe of the decanter with the power consumption of the decanter. Since the flow properties are very quickly adjusted, the decanter may be operated under favorable energy conditions i.e. with the lowest possible resistance, in this way by the introduction of, for example, sodium hydroxide optionally in admixture with surfactants.

The process according to the invention is illustrated by the following Examples, given percentages are percentages by weight:

EXAMPLE 1

A cascade consisting of 4 stirrer-equipped vessels was continuously fed with 3.16 liters/hour of an aqueous suspension of 28° C. containing 100 g of limestone powder per liter. At the same time, 27.9% $H_2SiF_6$ solution was continuously introduced into the first stirrer-equipped vessel in such a quantity that a pH-value of from 4.1 to 4.3 was obtained in the fourth stirrer-equipped vessel. The residence time of the suspension in the cascade was 25 to 30 minutes. The $CaF_2$ suspension was continuously filtered off under suction over a period of 30 minutes and washed with 500 ml of water. NaOH was then continuously introduced over a period of 30 minutes into the fourth stirrer-equipped vessel in such a quantity that a pH-value of from 5.0 to 5.5 was obtained, and was similarly filtered off under suction. The fourth stirrer-equipped vessel was then operated for 60 minutes without any additions and a sample again removed under suction over the last 30 minutes. In the same way as described above for NaOH, the fourth vessel was then operated with an addition of $NH_4OH$ solution, then without any addition and, finally, with an addition of $Ca(OH)_2$-solution. The samples were all washed, dried and analyzed in exactly the same way. The following Table shows that the composition differs only slightly:

| No. | Addition | pH | % water at 110° C. | % $CaF_2$ in the dry | % $SiO_2$ solid | behavior of solid |
|---|---|---|---|---|---|---|
| 1 | — | 4.3 | 34.1 | 90.7 | 2.8 | dilatant |
| 2 | NaOH | 5.5 | 36.5 | 89.4 | 3.3 | pasty |
| 3 | — | 4.3 | 34.0 | 88.5 | 3.0 | dilatant |
| 4 | $NH_4OH$ | 5.5 | 37.7 | 89.6 | 3.3 | pasty |
| 5 | — | 4.3 | 35.0 | 89.2 | 3.0 | dilatant |
| 6 | $Ca(OH)_2$ | 5.5 | 38.7 | 88.2 | 3.9 | pasty |

EXAMPLE 2

Using a stirrer-equipped vessel, 90 kg of 98% limestone powder were suspended in 900 liters of water of 16° C. followed by the addition over a period of 20 minutes of 150 kg of fluosilicic acid (28.4% $H_2SiF$). Following an after-reaction, the pH-value reached 3.8. A full-jacket screw centrifuge (decanter) was fed continuously with 600 l/h of the suspension. A clear solution was initially separated off, but no solid discharged. After a few minutes, the built-in overload switch switched off the decanter. A sample of the solid filtered off with a vacuum filter showed highly dilatant behavior. After the decanter had been cleaned, it was again fed with the same suspension, but with a pH of 6.1 adjusted by the addition of approximately 10 l/h of 4% NaOH solution into the feed pipe of the decanter. The decanter separated off the $CaF_2$ in the form of a pasty sludge without any interruptions. A sample filtered off under suction at pH 3.7 contained 3.3% of $SiO_2$, while the solid decanted at pH 6.1 contained 4.3% of $SiO_2$ (based on dried solid).

EXAMPLE 3

In a stirrer-equipped vessel cascade of three reactors, a limestone powder suspension of 15° C. containing 200g of $CaCO_3$ per liter was continuously reacted with fluosilicic acid (28.0% $H_2SiF_6$) in such a way that a pH-value of 4.3 was obtained in the last reactor for an overall residence time of 25 to 30 minutes. A decanter was fed with 450 l/h of the suspension but cut out in the same way as in Example 2. After the decanter had been cleaned, NaOH solution was introduced into the feed pipe of the decanter in a quantity of approximately 660 g of NaOH/m³ so that a pH-value of 6.1 was obtained. The decanter separated without any difficulty, even when the throughput was increased to 850 l/h.

The solid samples had the following composition:

| Separation with | pH | − % H$_2$O 110° C. | % CaF$_2$ in the dry | % SiO$_2$ solid | behavior of solid |
|---|---|---|---|---|---|
| vacuum filter | 4.3 | 37.4 | 88.0 | 3.3 | dilatant |
| decanter | 6.1 | 31.0 | 92.0 | 4.5 | pasty |

EXAMPLE 3a

The CaF$_2$-sludge of Example 3 was suspended with water in a ratio of 1:2 and redecanted in a throughput of 250 1/h, an increase in pH to 6.1 again being necessary in order to guarantee discharge of the solid. The CaF$_2$-sludge separated off then contained 28.0% of water and 3.2% of SiO$_2$, based on dry solid.

EXAMPLE 3b

Before decantation, solutions of standard commercial-grade anionic wetting agents, consisting essentially of alkyl sulfonates, were added either individually or in admixture with non-ionic standard commercial-grade dispersants to a suspension of the type described in Example 2 in quantities of from 5 to 50 ppm (based on the suspension). The decanter separated the CaF$_2$ in the form of a flowing sludge, but frequently worked irregularly, as could be seen from the power consumption of the drive motor. When the pH-value was simultaneously raised, as described in Example 3, the decanter separated without any interruptions.

It will be understood that the specification and examples are illustrative but not limitative of the present invention and that other embodiments within the spirit and scope of the invention will suggest themselves to those skilled in the art.

What is claimed is:

1. A process for the production of synthetic fluorspar of low silicon dioxide content wherein hexafluosilicic acid is added in an amount ranging from slightly below up to about stoichiometric amount to an aqueous calcium carbonate suspension at a temperature from about 0° C. to 40° C., and the calcium fluoride formed is separated off as a sludge from the dilute silica sol and optionally washed out, the improvement which comprises reacting the calcium carbonate with the hexafluosilicic acid in such a way that the pH-value of the fully reacted solution amounts to between about 3.6 to 4.6, and adding a fast-reacting proton acceptor to the reaction mixture immediately before separation of the calcium fluoride in amount sufficient to raise the pH to about 5.0 to 6.4, whereby the calcium fluoride sludge can be readily separated from the silica sol prior to gelation of the silica.

2. A process as claimed in claim 1, wherein the reaction mixture is raised to a pH of about 5.8 to 6.2.

3. A process as claimed in claim 1, wherein the fast-reacting proton acceptor is at least one alkali metal or ammonium hydroxide, carbonate or hydrogen carbonate or alkaline earth metal hydroxide.

4. A process as claimed in claim 1, wherein a surface-active substance is added in addition to the fast-reacting proton acceptor to improve the fluidity of the calcium fluoride sludge.

5. A process as claimed in claim 4, wherein the surface-active substance is an anionic or non-ionic dispersant.

6. A process as claimed in claim 4, wherein the calcium fluoride separated off is washed out and additional fast-reacting proton acceptor is added prior to separating.

7. A process as claimed in claim 1, wherein after the pH is raised the calcium fluoride is separated from the silica sol by decanting or centrifugation.

8. A process as claimed in claim 3, wherein the reaction mixture and an anionic or non-ionic dispersant is added in addition to the fast-reacting proton acceptor, the calcium fluoride is separated off from the silica sol by decanting or centrifugation within about 4 to 10 seconds after raising of the pH, the calcium fluoride separated off is washed out and additional fast-reacting proton acceptor is added after washing out before separation.

9. A process as claimed in claim 1, in which the hexafluosilicic acid is used in substantially stoichiometric quantities relative to the calcium carbonate.

10. A process as claimed in claim 1, in which a slight deficit of hexafluosilicic acid is used.